United States Patent [19]
Williames

[11] Patent Number: 4,970,972
[45] Date of Patent: Nov. 20, 1990

[54] SEEDLING PLANTING MACHINE

[75] Inventor: Geoffrey A. Williames, Warragul, Australia

[73] Assignee: Williames Hi-Tech International Pty Ltd., Victoria, Australia

[21] Appl. No.: 135,025
[22] PCT Filed: Feb. 5, 1987
[86] PCT No.: PCT/AU87/00030
  § 371 Date: Oct. 5, 1987
  § 102(e) Date: Oct. 5, 1987
[87] PCT Pub. No.: WO87/04585
  PCT Pub. Date: Aug. 13, 1987

[30] Foreign Application Priority Data
  Feb. 6, 1986 [AU] Australia ............... PH 4479
  Jun. 11, 1986 [AU] Australia ............... PH 6361

[51] Int. Cl.$^5$ ........................... A01C 11/00
[52] U.S. Cl. ................................. 111/111
[58] Field of Search ............. 111/2, 3, 7, 100; 47/77

[56] References Cited

U.S. PATENT DOCUMENTS

| | | | |
|---|---|---|---|
| 2,348,787 | 5/1944 | Cordes | 111/100 |
| 2,751,865 | 6/1956 | Horey | 111/100 |
| 2,980,041 | 4/1961 | Nielsen | 111/109 |
| 3,524,419 | 8/1970 | Middleton | 47/73 X |
| 3,712,252 | 1/1973 | Huang | 47/87 X |
| 3,923,332 | 12/1975 | Shirouzu | 111/2 X |
| 4,132,337 | 1/1979 | Masuda et al. | 111/2 X |
| 4,215,513 | 8/1980 | Dedolph | 111/105 X |
| 4,307,827 | 12/1981 | Turunen | 111/2 X |
| 4,341,333 | 7/1982 | Boa et al. | 111/2 X |
| 4,408,549 | 10/1983 | Quarnström | 111/2 |
| 4,443,151 | 4/1984 | Armstrong et al. | 111/3 X |
| 4,597,343 | 7/1986 | Nambu | 111/2 |
| 4,616,578 | 10/1986 | Talbott | 111/2 |

Primary Examiner—Robert A. Hafer
Assistant Examiner—S. Rimell
Attorney, Agent, or Firm—Learman & McCulloch

[57] ABSTRACT

A mobile seedling transplanting machine adapted to transfer growing seedlings from propagating containers to a field in proper position for further growth. The machine includes indexing apparatus for indexing the seedling propagating cells in sequence past a transfer mechanism which ejects the seedlings and transfers them to a handling device having two pairs of rotatable discs, the first pair of which grips each seedling by its root end and moves it part way toward the ground and the second pair of which subsequently receives each seedling from the first pair, grips it by its foliage end, and moves it closer to the ground. The second pair of discs releases each seedling in succession to a prepared planting ground formed by a plough shoe or the like.

28 Claims, 6 Drawing Sheets

SEEDLING PLANTING MACHINE

The present invention relates to a seedling planting machine of the type adapted to remove growing seedlings from receptacles or support members in which they have been grown and to transfer the seedlings to and transplant them in the earth in position for further growth.

The objective of the present invention is to provide a machine of the aforementioned type which is capable of planting seedlings as desired with minimum manual input by the operator.

In U.S. Pat. No. 4,763,443, there is disclosed a chain of rigid individual cells formed together in substantially rigid lengths which are hinged one to another. The hinge arrangement enables each rigid length to be folded against another length to provide a compact array of seedling propogating and growing support receptacles. When the hinged rigid lengths are extended they form a chain capable of being driven transplanting the seedlings to any desired location. The present invention is particularly useful with cell chains of this type but it should be appreciated that the invention is not limited thereto. Any array, mechanism or means of presenting individual seedlings in sequence to the apparatus of the present invention is capable of being usefully employed therewith.

According to a first aspect of the present invention there is provided planting apparatus for seedlings propagated in seedling support means, said apparatus comprising transfer means for removing seedlings from the seedling support means and delivering the seedlings sequentially to a transport mechanism, said transport mechanism being adapted to deliver and deposit the seedlings in a prepared planting position. Conveniently the apparatus further includes planting preparation means adapted to prepare the said planting position.

According to a second aspect of the present invention there is provided a handling mechanism adapted for handling seedlings in a planting machine, said handling mechanism comprising a first rotatable member having seedling gripping regions, said seedling gripping regions being adapted to receive and hold root regions of seedlings during at least predetermined zones of a first movement path defined by said seedling gripping regions of the first rotatable member, a second rotatable member having seedling gripping regions adapted to receive and hold foliage regions of seedlings over a predetermined zone of a second path of movement located adjacent said first path of movement over at least a predetermined region, said handling mechanism being adapted to transfer seedlings between said first and second rotatable members over said predetermined region.

Preferably the first and second rotatable members are formed by pairs of flexible discs with the gripping regions being formed by confronting internal peripheral surface zones of the respective disc pairs. Conveniently each of the pairs of flexible discs have their peripheral surface zones urged together over predetermined lengths of the peripheral surface zones. This in either case may be achieved by angling the planes of the respective discs or by using outer and inner pressure members such as rollers. It will of course be apparent that both these means might be employed simultaneously if desired.

The transfer apparatus thus described enables seedlings to be delivered in an upright condition to the first pair of rotatable members to be gripped thereby, the seedlings then being automatically inverted by being gripped by the second pair of rotatable members so that they are then in a suitable configuration for planting.

According to a third aspect of the present invention there is provided a seedling transfer mechanism for use in planting apparatus of the aforementioned type, said transfer mechanism being arranged to remove seedlings from a support means in which the seedlings have been grown and to move such seedlings to a transport position for subsequent movement to a planting position, said transfer mechanism comprising means for moving said support means whereby seedlings are positioned in sequence in a delivery guide track, means for removing a seedling from its associated support means, and transfer means for moving a seedling removed from its associated support means laterally relative to said guide track to said transport position. Conveniently the transfer means comprises a shroud member positionable between foliage of adjacent seedlings and a pusher member operable after positioning of the shroud member to move said seedlings to the transport position. Preferably the removing means comprises a pusher member operable from below the delivery guide track to move seedlings upwardly after positioning of the shroud member, the shroud member including stop means to limit upward movement of the seedling during removal from its associated support means.

A preferred embodiment of the present invention will hereinafter be described with reference to the accompanying drawings in which.

Referring to the drawings there is illustrated a mobile planting machine adapted to field plant seedlings basically in line at selectable even spacings. The machine illustrated might be drawn by a tractor or any other suitable powered transport means with air compressor means driven from a suitable power take off of the tractor or the like for driving the various air cylinders used in the operation of the apparatus illustrated. The apparatus illustrated may be drawn as a single unit or in multiple units from a suitable bar construction (not illustrated). The draw bar construction may comprise a single draw bar or multiple draw bars, for example, it is envisaged that units as illustrated might be arranged in two spaced rows with the units in each of the rows being offset relative to the units in the other rows. In this manner it is possible to plant seedlings simultaneously in closely adjacent lines with any desired spacing and pattern of planting. For example, it would be possible to have the seedlings planted in each line either aligned or offset relative to seedlings in adjacent lines.

The invention will hereinafter be described in relation to the single unit 10 illustrated in the accompanying drawings. The unit 10 comprises a seedling receiving zone 11 adapted to receive a supply of seedlings ready for planting into a desired position (usually in a field). The seedling planting unit further includes a guide track 12 leading from the receiving zone 11 with a delivery track section 13 leading through a transfer mechanism 14, the transfer mechanism being arranged to remove the seedlings including the propagating medium in which they have been grown from the support means (cell chain as illustrated) containing the seedlings. The transfer mechanism 14 also is adapted to move the seedlings sequentially into engagement with a handling and transport mechanism 15 (FIG. 2) adapted to move the seedlings from the delivery guide track section 13 to a prepared planting position. The unit includes planting ground preparation means 16 adapted to create a furrow into which seedlings are sequentially dropped, the earth being returned around the seedlings by suitable press wheels or the like 17. The guide track 12 further includes an outfeed section 18 along which the emptied cell chain seedling support elements travel to a collection zone 19. A cell chain indexing and locking mechanism 20 is provided downstream of the transfer mechanism 14, but, it should also be appreciated that the mechanism 20 could be located upstream of the transfer mechanism 14.

Conveniently the seedlings to be planted out are grown in a chain of individual support receptacles known as cells. The type of arrangement of cells illustrated in the above identified patent is particularly adapted for use in this planting machine, but any other hinged cell or support arrangement might also be used. As illustrated in the receiving zone 11 the hinged cell chain is arranged in such manner that the cells are closely adjacent one another. In this condition they may be supported in a tray (not illustrated) having a surrounding frame with a planar bottom loosely supported on the surrounding frame. The seedling receiving zone 11 includes an island platform corresponding roughly to the shape of the planar tray bottom whereby when the tray is located in the zone 11, the supporting frame of the tray drops below the level of the island platform to allow the cell chain to be fed directly into the guide track 12.

The first length of a new cell chain is simply hingedly connected to the last length of the chain previously passing through the machine and the chain is then fed through the machine as hereinafter described.

Figure 1:
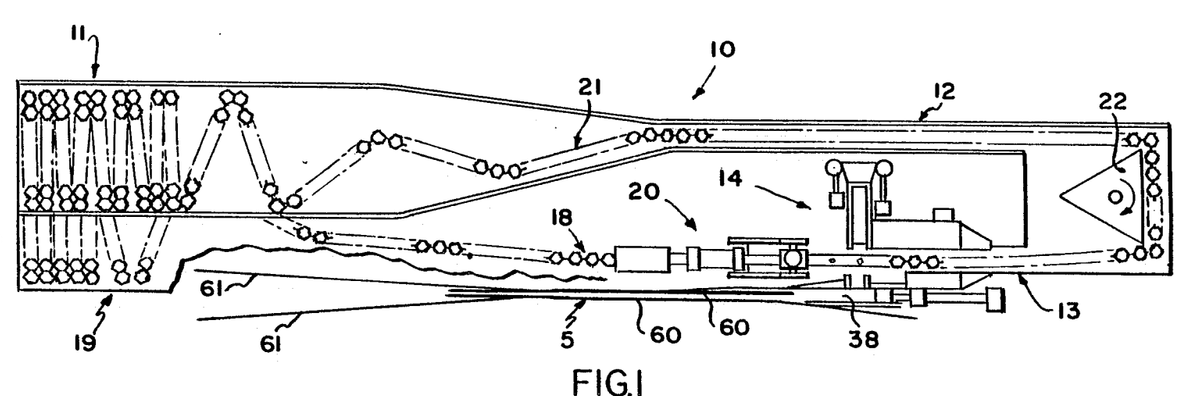
FIG. 1 is a schematic plan view of a planting machine (omitting certain parts for clarity) according to the present invention.

As shown in FIG. 1, the cell chain 21 carrying seedlings passes along the guide track 12 to a forward end of the machine where it passes around a triangular shaped freely rotatable member 22. The rotatable member 22 is provided essentially to reverse the direction of movement of the chain to minimise the overall length of the unit 10. The peripheral shape of the member 22 is dictated by the length of the rigid sections of the cell chain 21 and naturally would be variable depending upon the type of cell chain employed. The member 22 redirects the cell chain into the delivery guide track 13 leading past the transfer mechanism 14 better illustrated in FIG. 3.

Figure 3:
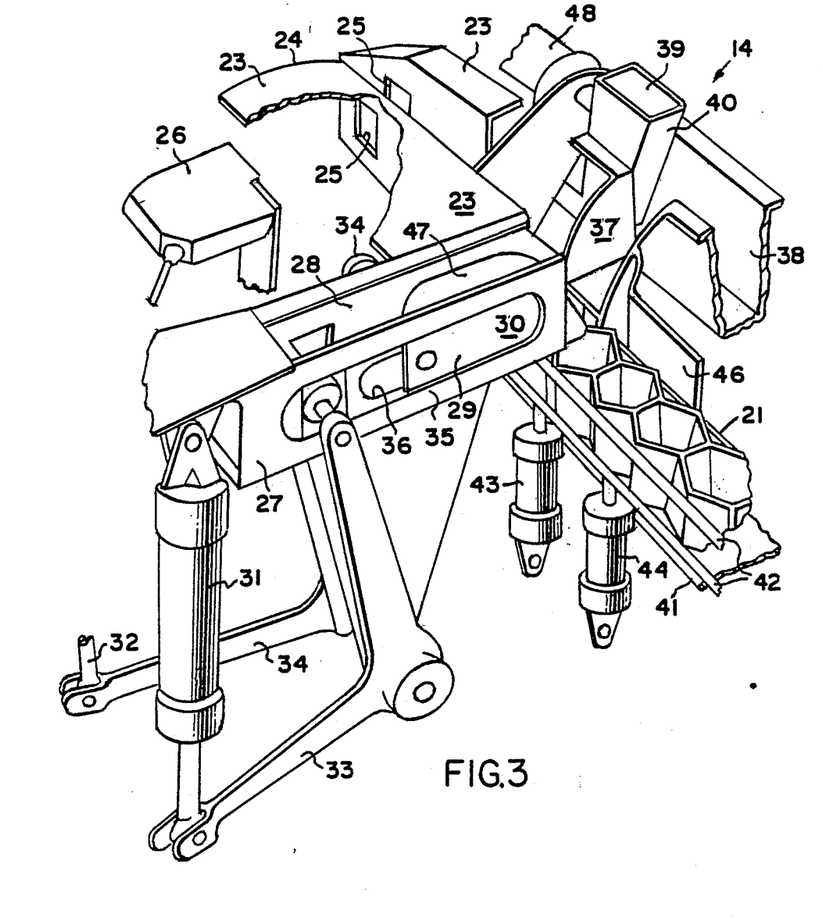
FIG. 3 is an isometric view of a transfer mechanism capable of removing seedlings from a cell chain and delivering seedlings for subsequent handling and transport to a planting position.

The transfer mechanism includes an infeed guide or baffle 23 having upwardly sloping forward faces 24 adapted to lift foliage of seedlings upwardly away from the stem or stalk region thereof. This upward lifting of foliage might be assisted by suitably placed upwardly directed air jets supplied with air from the pressurised air source or from the exhaust from the pneumatic cylinders used in operation of the machine. The lateral width of the channel defined by the baffle 23 may also be progressively narrowed to minimise the tendency of foliage dropping around the stalks. Suitable windows 25 are provided in the baffle 23 to form a detection zone and enable any suitable detection means 26 such as an optical sensor to determine whether or not a seedling stem or stalk has passed the detection zone. It will of course be appreciated that not all seeds necessarily produce seedlings of sufficient quality or strength and it is quite possible that some individual cells will not contain a suitable seedling. Unless action is taken to correct this uneven spacing of seedlings planted would result. The detection means 26 is therefore provided to sense that a suitable seedling exists in the relevant cell and to establish a signal therefrom to control both the cell chain indexing and locking mechanism 20 and the seedling transfer mechanism 14. In this manner it is possible to establish an even spacing of seedlings delivered from the transfer mechanism 14 to the handling and transport mechanism 15. Cells not containing any seedlings are moved past the transfer mechanism to be emptied as explained hereinafter.

The transfer mechanism 14 comprises a stationary guide 27 laterally extending from the delivery guide track 13. The guide 27 includes a pusher member 28 and a shroud member 29 slidably located therein. The shroud member 29 has forward upstanding side walls 30 adapted to extend across the delivery guide track 13 to separate foliage between seedlings. The rear portion of the shroud 29 has a U-shaped configuration in cross-section view and the pusher member 28 slides within this section. Both the pusher member 28 and the shroud 29 are moved to and fro by separate air cylinders 31, 32 operating bell cranks 33, 34 connected to the pusher member 28 and the shroud 29 respectively. Appropriate slots 35, 36 are provided in the guide 26 and the pusher member 28 to enable free movement of the respective members as desired.

Figures 4, 5:
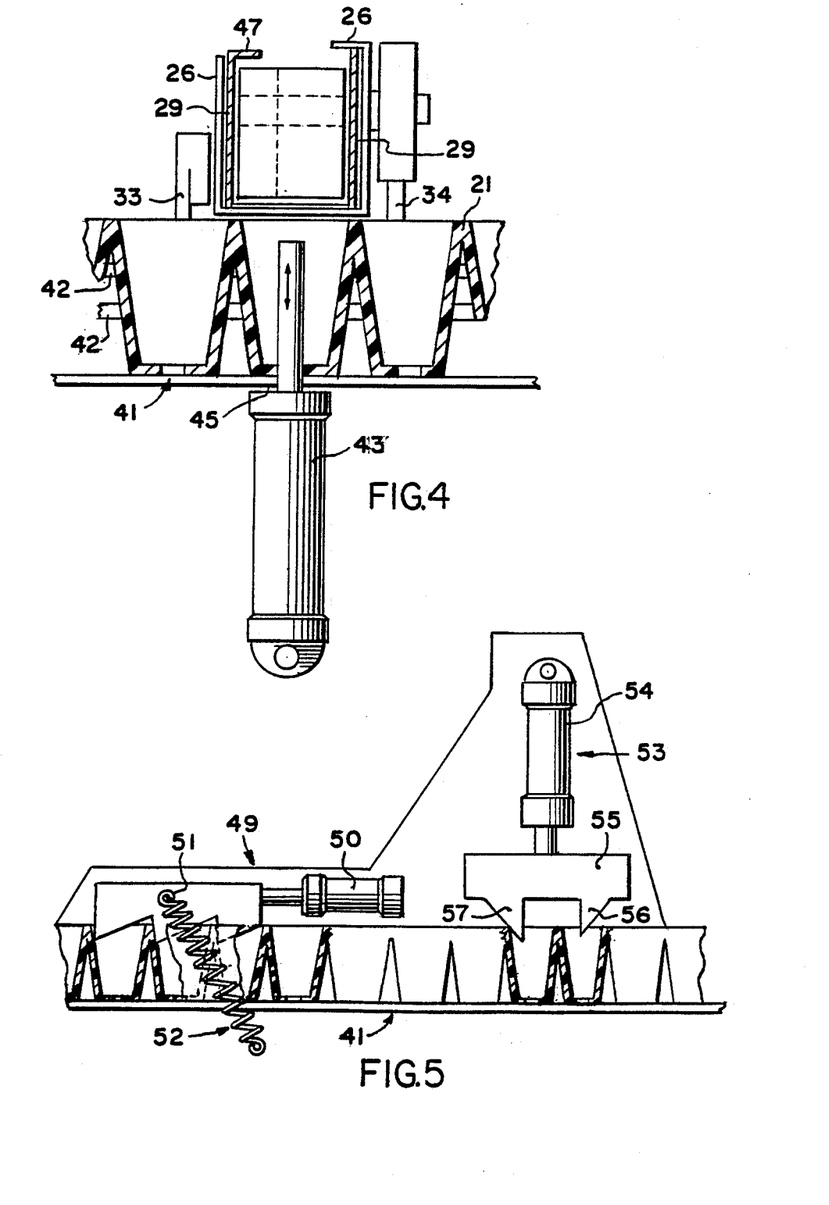
FIG. 4 is a partial longitudinal cross sectional view along the delivery guide track at the transfer mechanism shown in FIG. 3.
FIG. 5 is a partial longitudinal cross-sectional view along the delivery guide track subsequent to the transfer mechanism illustrating the cell chain indexing and locking means.

Opposite the guide 26 is a chute 37 leading into a seedling feed track 38. A pusher member 39 is located in the seedling feed track 38 and is operated by an air cylinder 48. The pusher member 39 has an angled forward face 40 adapted to counteract the tendency of seedlings to topple backwardly when being pushed along the track 38 at relatively high speed. It may in some instances be desirable to include an upstanding net arrangement from the pusher member 39 to support seedling foliage, particularly when taller seedling plants are being handled. The cell chain 21 passes generally between and below the stationary guide 27 and the chute 37 and is supported on a stationary platform 41. Stationary open side supporting guide/bars 42 are provided to ensure that any soil, sand or grit particles escaping from the cell chain does not build up in the cell chain track. Located beneath the platform 41 are a pair of air cylinders 43 and 44. The cylinder 43 includes a pusher rod movable upwardly through an opening 45 in the platform 41, through the drainage openings in the cell chain to eject a seedling together with its plug of propagating medium upwardly from the cell chain. The air cylinder 44 is similarly configured and disposed but is arranged to eject propagating medium plugs which have been sensed to not include a suitable seedling for transplanting. These plugs are ejected upwardly to strike a deflector plate 46 to be deposited to one side of the guide track 13.

In operation, a seedling having been sensed to be of suitable size is positioned in the guide track 13 between the guide 27 and the chute 37. Plant spacing may be regulated by a pulse generator and sensor located at land engaging wheels such as the press wheels 17. Alternatively a separate land wheel (not illustrated) may be employed to which the pulse generator is connected. The pulse generator creates pulses in response to movement of the wheels 17 (or other land wheel) over the ground. A counter counts these pulses and at a predetermined set number sensed, commences operation of the transfer mechanism 14. Varying the number of counts sensed enables variation of the spacing between seedlings transferred by the mechanism 14 and therefore also between seedlings planted. The indexing mechanism simply moves the cell chain quickly enough to ensure that a seedling is always correctly positioned prior to operation of the mechanism 14.

The shroud 30 is first moved across the guide track 13 to separate foliage between seedlings. The air cylinder 43 is operated to eject the seedling upwardly. Upward movement is limited by an overlying flange 47 of the shroud 30. The pusher member 29 is then activated to push the seedling sideways into the chute 37 and thereafter into the feed track 38 leading to the handling and transport mechanism 15. The air cylinder 48 effects movement of the seedlings along the track 38.

As shown in FIG. 5, a cell chain indexing, centering and locking mechanism is provided for both moving the cell chain as desired and for centering and locking the cell chain in the correct position when a seedling is transferred. The indexing mechanism 49 comprises a double acting air cylinder 50 adapted to move a ratchet type push member 51 to and fro relative to the guide track 13. Springs 52 are provided to urge the push member 51 downwardly. Movement to the left in FIG. 5 of the push member 51 indexes the chain along the guide track 13. Movement to the right enables the ramp sections of the pusher member to slide over the cell chain walls to resume a position ready for a further indexing movement. The centering and locking mechanism 53 includes an actuating air cylinder 54 and a block member 55 moved thereby. The block member 55 includes two triangular shaped lugs 56, 57, the angular wall sections of which are adapted to engage opposed walls of two adjacent cells. The ramp or angular walls locate the cell chain and allow for minor adjustment of the cell chain forwardly or rearwardly thereafter locking the cell chain in position when a seedling is about to be transferred.

Figure 2:
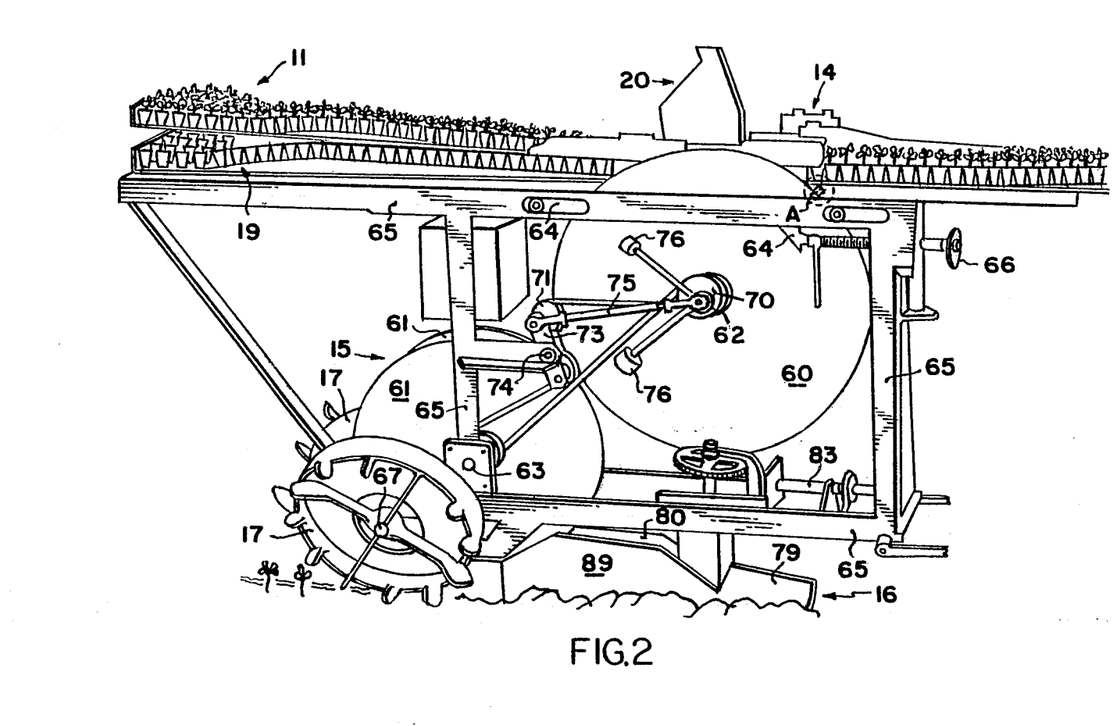
FIG. 2 is a side isometric view of the planting machine illustrated in FIG. 1.
Figure 6:
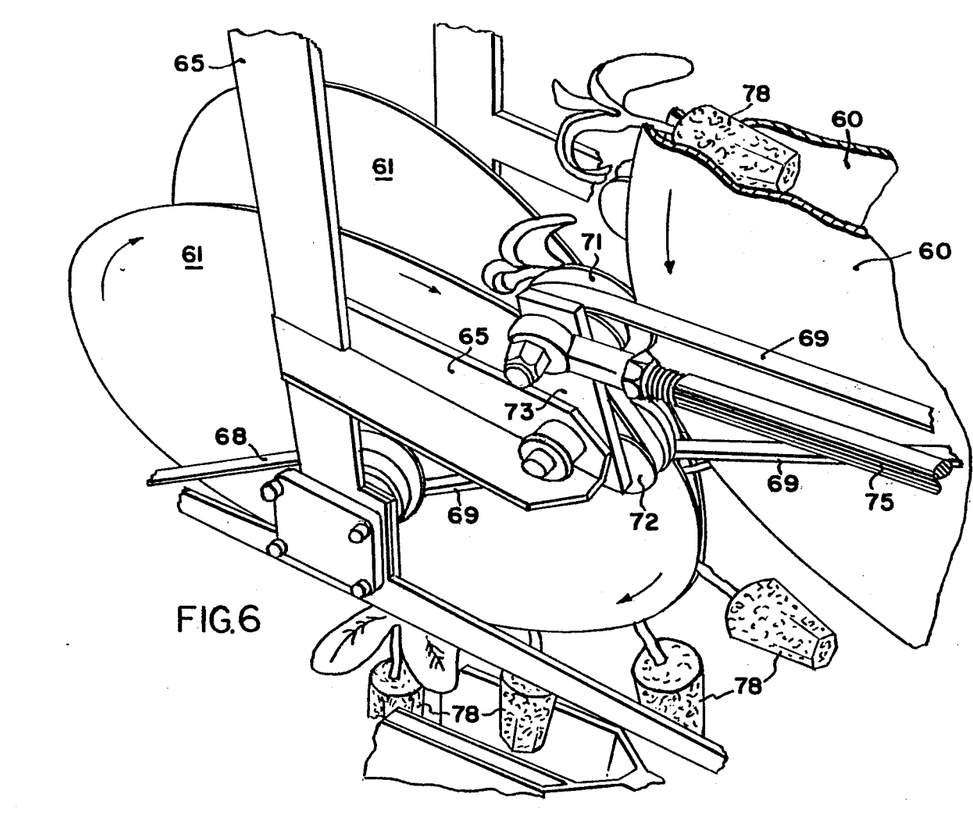
FIG. 6 is a detailed partial perspective view of a section of the seedling handling and transport discs used to deliver seedlings to a planting position.
Figure 7:
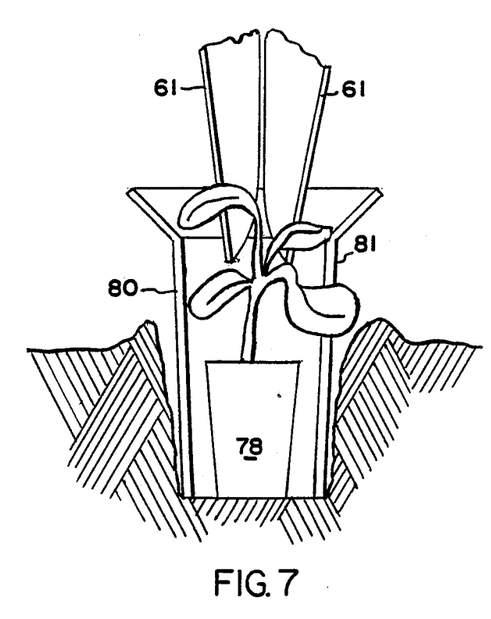
FIG. 7 is a cross sectional view showing a seedling delivered into a planting position.

Reference will now be made principally to FIGS. 2, 6 and 7. The handling and transport mechanism 15 essentially comprises a pair of upper discs 60 and a pair of lower discs 61. These discs are conveniently made from thin flexible and resilient stainless steel, however other materials could also be used. Both pairs of discs 60, 61 are rotatably support on shafts 62, 63 common to each pair. The upper pair of discs 60 are supported on a frame 64 adapted to moved longitudinally relative to the main unit frame 65 by a suitable screw mechanism 66 (or any other suitable actuating mechanism). This mechanism allows limited adjustment of the spacing between the upper and lower discs 60, 61 which enables the position at which the lower discs 61 grip the seedlings to be varied to vary the depth of planting of the seedlings as might be desired.

A pair of ground contacting press wheels 17 are provided rotatably supported on axes 67 slightly below and rearwardly of the lower disc shaft 63. These press wheels press soil back around planted seedlings once they have been planted by the mechanism 15. The press wheels 17 also provide a source of rotation for driving the disc pairs 60 and 61. Any form of drive transmission such as gears and shafts might be employed, however, in the embodiment illustrated a belt 68 drives the lower discs 61 in response to rotation of the press wheels 17 at a peripheral speed substantially identical to the speed of travel of the unit over the ground such that there is no differential of speed between plants deposited from the discs 61 and the ground itself. A second belt drive 69 passes from a pulley on the shaft 63 over a pulley 70 on shaft 62, through a pair of pulleys 71, 72 on either end of a pivoted link 73 and back to the pulley on shaft 63. The link 73 is pivoted at an intermediate position 74 along its length to a stationary section of the main frame 65. Moreover a rigid link 75 interconnects the shaft of the upper pulley 71 on link 73 with the shaft 62 of the upper discs 60. In this manner longitudinal movement of the discs 60 can be effected by the screw element 66 without substantially stretching the belt 69.

Figure 2A:
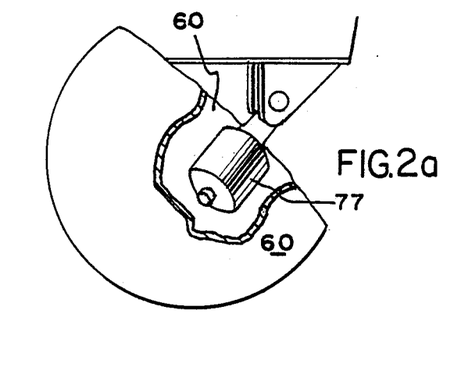
FIG. 2a is a partially cut away isometric detail of the region A shown in FIG. 2.

Arranged around the upper section of the discs 60 on both outer surfaces thereof are stationary pressure rollers 76, the rollers being located from about top dead centre position to about the closest point of approach of the lower discs 61. The rollers 76 are adapted to urge the discs 60 together over the region between the first and last of these rollers. As can be seen in FIG. 1 the two upper discs 60 pass around the feed track 38 leading from the transfer mechanism 14. An inner spreading roller 77 (FIG. 2a) is located immediately before the track 38 to allow the discs 60 to pass therearound and to allow a seedling 78 to be pushed directly into the space between the discs 60. The outer rollers 76 thereafter press the discs 60 together against the plugs of soil of the seedlings 78 transplanted thereby.

As best seen in FIG. 6, the lower pair of discs 61 are angled relative to one another whereby their peripheral edges are pressed towards one another in the region from about the closest approach of the upper discs 60 to just before bottom dead centre position where the plants 78 are discharged thereform. As will be seen in FIGS. 6 and 7 seedlings 78 are carried by their root sections in the upper discs 60 and are transported thereby downwardly along a path part way towards ground to a zone adjacent the second lower pair of discs 61. As they approach the zone of the discs 61 the foliage section of the seedlings enters between the discs 61 while still being carried by the roots in the upper discs 60. It may also be useful to provide stationary guides (not illustrated), in this region to help guide the foliage into the lower discs 61 to help overcome difficulties that might be occasioned by bent stalks or stems on the seedlings. Consequently on further movement the seedlings are progressively more firmly gripped by the foliage in the lower discs 61 and a lower spreader roller 77 spreads the upper discs 60 apart releasing the root regions therefrom.

The seedlings are thereafter held solely by the lower discs 61 and are transported along a path towards the ground to about bottom dead centre position where the lower discs have spread apart sufficiently to release the seedlings 78 and enable them to drop by gravity onto the ground in position for further growth (best seen in FIGS. 6 and 7).

The machine further comprises means 16 for preparing the planting ground to receive seedlings. This may comprise a plough element 79 (FIG. 2) with trailing upright spaced guide plates 80, 81 acting as a guide to receive the root sections of plants depending from the periphery of the discs 61. If necessary it may also incorporate disc plough elements to assist in the formation of the planting furrow. As shown in FIG. 2, the plough element 79 may include suitable adjusting mechanisms 83 to vary either the height/depth of the element or the spacing relative to the lower discs 61.

It may be desirable to include, in some instances, cushioning material on the inner surfaces of the respective discs 60, 61 to protect the root and foliage sections of the plants. This, however, is not considered to be necessary in most circumstances. The machine components are also suitably arranged such that the transfer mechanism 14 and the indexing mechanism 15 are easily removed to be replaced either for servicing or simply to use a different sized cell chain. Similarly the plough shoe 79 may be replaced for servicing or sharpening. It should further be appreciated that the flow arrangement of the cell chain illustrated is not essential. For example the infeed and outfeed zones for the cell chain may be at the forward end of the unit 10 rather than the rear end as illustrated. In this manner, when two rows of planting units 10 are being drawn, the infeed and outfeed zones of both rows can be arranged close to one another to minimize movement distances for the operator.

I claim:

1. Apparatus for removing a growing seedling propagated in a seedling container from the container and transplanting said seedling to a prepared ground in position for further growth, each of said seedlings having a root end and a foliage end, said apparatus comprising transport means for moving said seedling containers sequentially to a seedling transfer station; transfer means for removing seedlings from the respective containers at said transfer station and for delivering said seedlings sequentially to seedling handling means, said seedling handling means comprising a first device for gripping successive seedlings at their root ends and moving said seedlings part way toward said ground, said seedling handling means including a second device for receiving successive seedlings from said first device and moving said seedlings further toward said ground, said second device having means for gripping the foliage end of said successive seedlings as the latter move toward said ground; and means for releasing successive seedlings from said second device with their root ends on said ground, said first device comprising a pair of flexible, confronting rotatable discs between which said seedlings may be gripped.

2. Apparatus according to claim 1 wherein the second device comprises a pair of flexible, confronting rotatable discs between which said seedlings may be gripped.

3. Apparatus according to claim 1 wherein the first device comprises a first pair of flexible, confronting rotatable discs, and the second device comprises a second pair of rotatable, confronting flexible discs, the discs of each of said first and second pairs of discs lying in planes angled relative to one another whereby the peripheries of the discs of each of said pairs are closer to one another in a single circumferential zone than elsewhere.

4. Apparatus according to claim 1 wherein the first device comprises a first pair of flexible, confronting, rotatable discs, the second device comprises a second pair of rotatable, confronting, flexible discs, first pressure means outward of the discs of each pair of said discs and urging said pair of discs toward one another, and second pressure means inward of the discs of each pair of said discs urging said pair of discs apart, the first and second pressure means being circumferentially spaced from one another.

5. Apparatus according to claim 3 wherein the discs of the first pair of discs are rotatable about an axis located at a level above that of the discs of said second pair of discs.

6. Apparatus according to claim 5 wherein the axes of rotation of the first and second pairs of rotatable discs are offset from a vertical plane therebetween.

7. Apparatus according to claim 1 wherein the transfer means comprises means for moving said seedling containers incrementally whereby seedlings are positioned in sequence in a delivery guide track, and wherein said transfer means includes ejection means for ejecting each seedling from its container.

8. Apparatus according to claim 7 wherein said transfer means comprises a transfer device for moving an ejected seedling laterally relative to said delivery guide track into a feed guide track, and means for moving ejected seedlings along said feed guide track to said first device.

9. Apparatus according to claim 7 or 8 wherein the ejection means for removing a seedling comprises a pusher element positioned at a level below that of the seedling container, and means for moving said pusher element upwardly through the container to eject the seedling therefrom.

10. Apparatus according to claim 9 further including limit means for limiting upward movement of the seedling following its ejection from said seedling container.

11. Apparatus according to claim 7 or 24 further including a shroud member movable between an extended position and a retracted position relative to the delivery guide track, the shroud member extending between the foliage of adjacent seedlings in said extended position immediately prior to the ejection of one of said adjacent seedlings from its associated container.

12. Apparatus according to claim 11 further including a lateral pusher element for moving ejected seedlings laterally of the delivery guide track into said feed guide track, and control means for ensuring that the shroud member is positioned in its extended position prior to movement of an ejected seedling by the lateral pusher.

13. Apparatus according to claim 1 including frame means movable relative to said planting ground, ground preparing means carried by said frame means preparing for said ground as the frame means moves along the ground, said ground preparing means including a forward furrow forming region and a rear portion defining a seedling receiving area with upright walls on either side, each seedling being delivered by said second device with the root end extending downwardly into said seedling receiving area, and a pair of ground engaging press wheels located rearwardly of the ground preparing means for pressing soil down and around seedlings in the seedling receiving area following the release of each seedling by said second device.

14. Apparatus according to claim 12 including drive means interconnecting said press wheels and the first and second devices for driving the latter in response to rotation of said press wheels.

15. Apparatus for transplanting to a planting ground seedlings growing in seedling containers, said apparatus comprising mobile frame means for traversing said planting ground; means supporting said containers on said frame means for movement relative thereto; means carried by said frame means forming a transfer station; means for moving said containers relative to said frame means sequentially to said transfer station; transfer means at said transfer station for ejecting seedlings from successive containers; transport means for receiving ejected seedlings and moving them away from said transfer station; and seedling handling means supported by said frame in a position to receive successive ejected seedlings from said transport means and move such seedlings toward said ground for deposit thereon in position for further growth; ground engaging wheels supported by said frame means in trailing relation to said handling means for embedding said seedlings in the planting ground; and drive means interconnecting said wheels and said handling means for operating the latter in response to rotation of said wheels.

16. Apparatus according to claim 15 wherein said seedling handling means comprises means for gripping and supporting each successive seedling as it is moved toward said ground and until such seedling is in position to be deposited on said ground.

17. Apparatus according to claim 15 wherein said seedling handling means comprises a first pair of confronting, rotatable discs of corresponding diameter having confronting surfaces at such an angle to one another that each successive seedling may be gripped by and between said discs for a portion only of the rotation thereof.

18. Apparatus according to claim 17 wherein said first pair of discs is supported relative to said transport means in such position that each successive seedling presented to said discs by said transport means may be accommodated between and gripped by said discs.

19. Apparatus according to claim 17 wherein said seedling handling means comprises a second pair of confronting, rotatable discs of corresponding diameter having confronting surfaces at such angle to one another that each successive seedling may be gripped by and between the discs of said second pair for a portion only of the rotation thereof.

20. Apparatus according to claim 19 wherein the angle of the confronting surfaces of the discs of said second pair is such that each successive seedling is released by the discs of said second pair in a position to drop vertically by gravity onto said ground.

21. Apparatus according to claim 19 wherein the second pair of discs is supported relative to said first pair of discs in such position that each successive seedling presented to said second pair of discs may be accommodated between and gripped by the discs of said second pair.

22. Apparatus according to claim 15 wherein each of said seedling containers is rigid.

23. Apparatus according to claim 15 wherein each of said seedling containers comprises a chain of interconnected rigid cells, each of said cells containing one seedling.

24. Apparatus according to claim 15 including means for holding said containers in fixed position at said transfer station during ejection of said seedlings.

25. Apparatus according to claim 17 or 19 wherein said discs are flexible for enabling said discs to flex when a seedling is introduced therebetween.

26. Apparatus according to claim 25 including pressure means acting on said discs for urging their peripheral surfaces toward one another over a selected circumferential length of said discs.

27. Apparatus according to claim 25 or 26 including pressure means interposed between said discs for spreading their peripheral surfaces apart over a selected circumferential length of said discs.

28. Apparatus according to claim 15 including means for sensing the presence of a seedling of at least a minimum size in each of said containers, and means responsive to said sensing means to regulate the operation of said transfer means.

* * * * *

UNITED STATES PATENT AND TRADEMARK OFFICE
CERTIFICATE OF CORRECTION

PATENT NO. : 4,970,972

DATED : November 20, 1990

INVENTOR(S) : Geoffrey A. Williames

It is certified that error appears in the above-identified patent and that said Letters Patent is hereby corrected as shown below:

Column 2, line 66 after "suitable" insert -- draw --.

Claim 11, line 1, change "24" to -- 8 --.

Signed and Sealed this

Twenty-eighth Day of April, 1992

Attest:

HARRY F. MANBECK. JR.

*Attesting Officer*  *Commissioner of Patents and Trademarks*